(12) United States Patent
Geller et al.

(10) Patent No.: US 9,070,122 B1
(45) Date of Patent: Jun. 30, 2015

(54) HOST-MANAGED GIFT CARD PROGRAM

(71) Applicant: Amazon Technologies, Inc., Reno, NV (US)

(72) Inventors: Michal J. Geller, Seattle, WA (US); Brian Randolph Williams, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/151,460

(22) Filed: Jan. 9, 2014

Related U.S. Application Data

(63) Continuation of application No. 12/978,331, filed on Dec. 23, 2010, now Pat. No. 8,662,387.

(51) Int. Cl.
*G06K 5/00* (2006.01)
*G06Q 20/00* (2012.01)
*G06Q 20/34* (2012.01)

(52) U.S. Cl.
CPC .............. *G06Q 20/00* (2013.01); *G06Q 20/342* (2013.01); *G06Q 20/347* (2013.01)

(58) Field of Classification Search
USPC ................. 235/380, 381, 382; 705/17, 64
See application file for complete search history.

(56) References Cited

U.S. PATENT DOCUMENTS

| | | | |
|---|---|---|---|
| 7,891,561 B2 | 2/2011 | Hanna | |
| 8,060,420 B2 | 11/2011 | Vardi | |
| 8,662,387 B1 * | 3/2014 | Geller et al. | 235/380 |
| 2008/0294518 A1 | 11/2008 | Weiss et al. | |
| 2012/0059736 A1 | 3/2012 | Bhattacharya et al. | |
| 2012/0109787 A1 | 5/2012 | Larrick et al. | |

OTHER PUBLICATIONS

Office action for U.S. Appl. No. 12/978,331, mailed on Nov. 30, 2012, Geller et al., "Host-Managed Gift Card Program", 9 pages.
Office action for U.S. Appl. No. 12/978,331, mailed on Apr. 12, 2013, Geller et al., "Host-Managed Gift Card Program", 6 pages.
Non-Final Office Action for U.S. Appl. No. 12/978,331, mailed on Jul. 2, 2012, Michel J. Geller et al., "Host Managed Gift Card Program", 6 pages.

* cited by examiner

*Primary Examiner* — Ahshik Kim
(74) *Attorney, Agent, or Firm* — Lee & Hayes, PLLC

(57) ABSTRACT

A host-managed gift card program may enable merchants to offer and redeem gift cards without integrating a gift card program with a point of sale (POS) system used by the merchant. The merchant may rely on a host, at least in part, to issue gift cards, manage a ledger, assist in redemption of gift cards when the cards are redeemed at the merchant's location, and perform other gift card-related tasks for the merchant.

20 Claims, 7 Drawing Sheets

HOST-MANAGED GIFT CARD PROGRAM

CROSS REFERENCE TO RELATED APPLICATION

This application is a continuation of co-pending, commonly owned U.S. patent application Ser. No. 12/978,331, filed Dec. 23, 2010, entitled "HOST-MANAGED GIFT CARD PROGRAM," the entirety of which is herein incorporated by reference.

BACKGROUND

Many retailers offer gift cards, which may be received by a user and then redeemed for goods, services, or both at a later time. Gift cards are popular as gifts and often exchanged between people during holidays, birthdays, or other occasions. People may also purchase gift cards for their own use or may receive them during a promotion.

Gift card transactions at a merchant location usually involve a redemption process that is fully integrated with a point of sale (POS) system. When processing gift cards, these merchants often use the same hardware (credit card reader, cash register, etc.) that is used to process other types of payment types (e.g., credit cards, debit cards, etc.). The merchants also typically have direct access to gift card balances and other information associated with gift cards because of the integration with the POS system. Unfortunately, integration with a POS system can be complex, and thus a restriction to implementation of a gift card program by a low volume or unsophisticated merchant.

Merchants often strive to improve customer loyalty and attract and retain new customers. By offering gift cards, a merchant may experience increases in customer loyalty and acquisition of new customers.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

A host-managed gift card program may enable low volume or unsophisticated merchants an ability to offer and redeem gift cards without integrating a gift card program with a point of sale (POS) system used by the merchant. Instead, the merchant may rely on a host, at least in part, to issue gift cards, manage a ledger, assist in redemption of gift cards when the cards are redeemed at the merchant's location, and perform other gift card-related tasks for the merchant. The host may be provider of payment services and/or accounting services.

The merchant may establish a gift card account with the host by providing a payment account to collect fund for the merchant and by specifying credentials and parameters used in a redemption process. The merchant may also specify some attributes of the gift cards, such as denominations, restrictions, and so forth. The gift cards may be offered for sale by the host, by the merchant, by other parties, or a combination thereof.

The host may provide secure processes to enable the merchant to redeem the gift cards at the merchant location without integration to the merchant's POS system. During redemption of a gift card, the merchant may use a networked device such as a mobile telephone or personal computer to redeem the gift cards at the merchant location. The networked device may include redemption software that is limited to operation after receipt of correct credentials and parameters that satisfy predetermined criteria. The merchant may verify an authenticity and balance of a gift card to be redeemed by communicating with the host using the redemption software. Upon completion of a transaction with the gift card, the host may update a balance of the gift card, which may later be reported to the merchant. In some instances, the report may be associated with a transaction number generated with the merchant's POS system to enable the merchant to reconcile transactions.

The techniques and systems described herein may be implemented in a number of ways. Example implementations are provided below with reference to the figures.

Illustrative Environment

Figure 1:
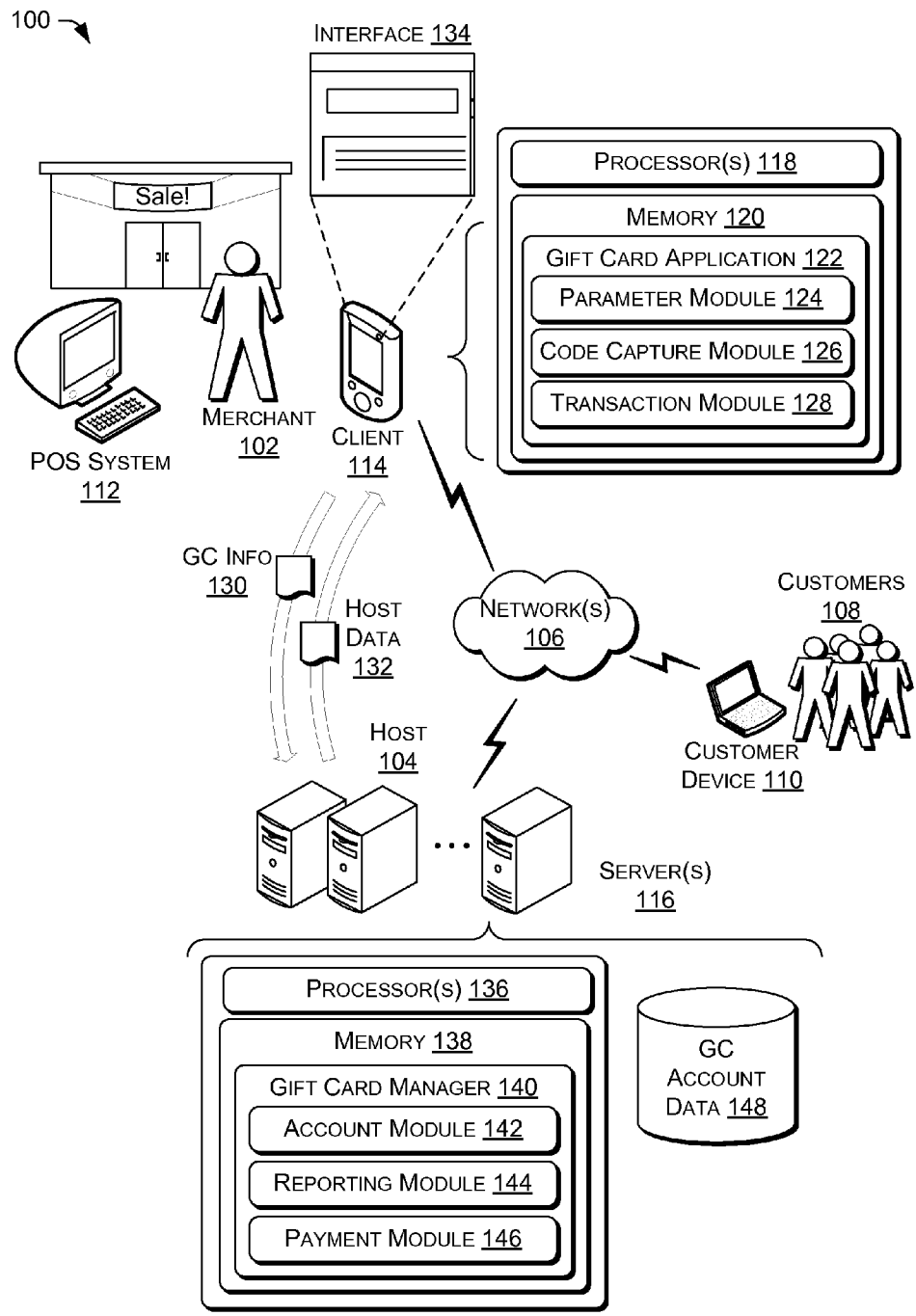
FIG. 1 is a schematic diagram of an illustrative computing environment to provide a host-managed gift card program.

FIG. 1 is a schematic diagram of an illustrative computing environment to provide a host-managed gift card program. The environment 100 includes a merchant 102 that is in communication with a host 104 via one or more networks 106. The merchant 102 and/or the host 104 may also be in communication with customers 108 through customer devices 110 via the one or more network(s) 106. The network(s) 106 are representative of many different types of networks, such as cable networks, the Internet, local area networks, mobile telephone networks, wide area networks and wireless networks, or a combination of such networks.

The merchant 102 may have a point of sale (POS) system 112 that is used to process transactions for the customers 110 that conduct business with the merchant. For example, the merchant 102 may offer goods, services, or both for consumption by the customers 110, who in turn pay for the goods or services they consume through transactions processed by the POS system 112. Payments may include an exchange of cash or processing of bank cards, such as credit cards and debit cards. The POS system 112 in this example does not include an integrated gift card system to process gift cards. Thus, the merchant 102 cannot issue and redeem gift cards with the POS system 112. Instead, the merchant 102 uses a client 114 to interact with servers 116 of the host 104 to issue and redeem gift cards as discussed herein.

The client 114 may be implemented as a personal computer, mobile computing device, or other type of device capable of exchanging information with the host 104 via the network(s) 106. In some embodiments, the client 114 may include a camera, bar code scanner, a radio frequency identification (RFID) reader, or other code capturing apparatus to enable the client 114 to extract information from a gift card when interacting with the gift card (e.g., during issuance, redemption, balance inquiries, etc.). The gift card may be a physical card, an electronic receipt, a printout of the receipt, or formed from another medium to enable communication of information associated with the gift card to the merchant 102.

As illustrated, the client 114 is equipped with one or more processor(s) 118 and memory 120. The memory 120 may include applications, modules, and/or data. In some embodiments, the memory 120 may include a gift card application 122 which may include modules to perform actions related to processing gift cards, such as issuing gift cards, redeeming at least a portion of a balance from an issued gift card, checking gift card balances, and so forth. The gift card application 122 may transmit information to and receive information from corresponding applications, components, and/or modules on the servers 116. The gift card application 122 may include a parameter module 124, a code capture module 126 and a transaction module 128 to perform some or all of the process performed for gift cards by the merchant 102. Each module is discussed in turn.

The parameter module 124 may monitor one or more parameters associated with the use of the gift card application to prevent unauthorized use of the gift card application. In some embodiments, the parameter module 124 may monitor a time and/or date to determine whether the gift card application 122 is available for use. For example, the gift card application 122 may not be available for use outside of normal business hours that are established by the merchant 102, shift hours established for employees of the merchant, or based on other time dependent conditions. In various embodiments, the parameter module 124 may monitor a location of the client 114 to determine whether the gift card application 122 is available for use. For example, when the client is a mobile device, such as a mobile telephone or a laptop computer, the gift card application 122 may be configured to operate or be accessible only when the client is located at the merchant's store or at other predetermined locations. The parameter module 124 may restrict use of the gift card application 122 when predetermined parameters are not satisfied by the client, the user of the client, or by other factors.

The code capture module 126 may receive data captured by the client 114 from a gift card and process the data to obtain an identifier for the gift card. For example, the code capture module 126 may convert an image of a bar code into a unique number associated with the gift card. The code capture module 126 may be capable of reading RFID tags, bar codes including two-dimensional bar codes, numbers on a gift card using optical character recognition (OCR), or other data from a gift card. The data may be captured or obtained using hardware integrated with the client 114 and/or with peripheral devices such as a camera, bar code scanner, card reader, RFID reader, and so forth that may be connected to the client 114, such as via a universal serial bus (USB) port or other type of wired or wireless connection.

The transaction module 128 may communicate the gift card information 130, which may include the gift card identifier, a transaction amount, and other information related to a transaction to the host 104 during redemption of a gift card or other related processes (e.g., sale of a card, balance inquiry, etc.). In some embodiments, the gift card information may include a transaction number from an associated transaction performed by the POS system 112 to enable reconciling transactions involving the gift cards with transactions performed using the POS system. The transaction module 128 may receive host data 132 from the host 104, such as in response to transmitting the gift card information 130. The host data 132 may include a confirmation that the gift card is authentic and may include a necessary balance to satisfy a transaction request or portion thereof, among other possible data.

An employee of the merchant 102 may interact with the gift card application 122 through a user interface 134 that may be reproduced by the client 114. For example, the employee may enter information about the gift card into the user interface 134, view reports, and/or otherwise interact with the gift card application via the user interface 134.

In accordance with various embodiments, the server(s) 116 are equipped with one or more processor(s) 136 and memory 138. The memory 138 may also include applications, modules, and/or data. In some embodiments, the memory 138 may include a gift card manager 140 to manage a gift card program for the merchant 102. The gift card manager 140 may interact with the gift card application 122 that resides on the client 114 in this example, such as to exchange information with the transaction module 128 including the gift card information 130 and the host data 132. The gift card manager 140 may include an account manager 142, a reporting module 144, and a payment module 146, among other possible modules. Each module is discussed in turn.

The account manager 142 may create and manage an account to issue and process gift card transactions. For example, the account module 142 may be used to establish the gift card program for use by the merchant 102. The account module 142 may also track the gift card data 148, which may be stored by the host 104, to record activity of the gift cards issued by the host 104 and/or the merchant 102. The account module 142 may also interact with the transaction module 128, such as to provide balances of gift cards, redeem gift cards during a transaction, add value to a gift card, and so forth.

The reporting module 144 may generate, maintain, and publish various reports based on the activity of the gift cards. For example, the reporting module 144 may maintain a ledger, balances, and other information for a gift card program with the merchant 102. The reporting module 144 may publish periodic reports to enable the merchant 102 to reconcile transactions and perform accounting functions.

The payment module 146 may perform payments to an account of the merchant 102 when money is collected for sale of a gift card by the host 104 for the merchant 102. The payment module 146 may perform payments as lump-sum payments, periodic payments, or otherwise may disperse funds from the host 104 to the merchant 102 related to the sale or redemption of the gift cards. In some embodiments, the payment module 146 may also provide payments to the merchant that may be processed though the POS system 112, which are described below with reference to FIG. 6.

Illustrative Creation of Gift Card Programs and Issuance of Gift Cards

Figure 2:
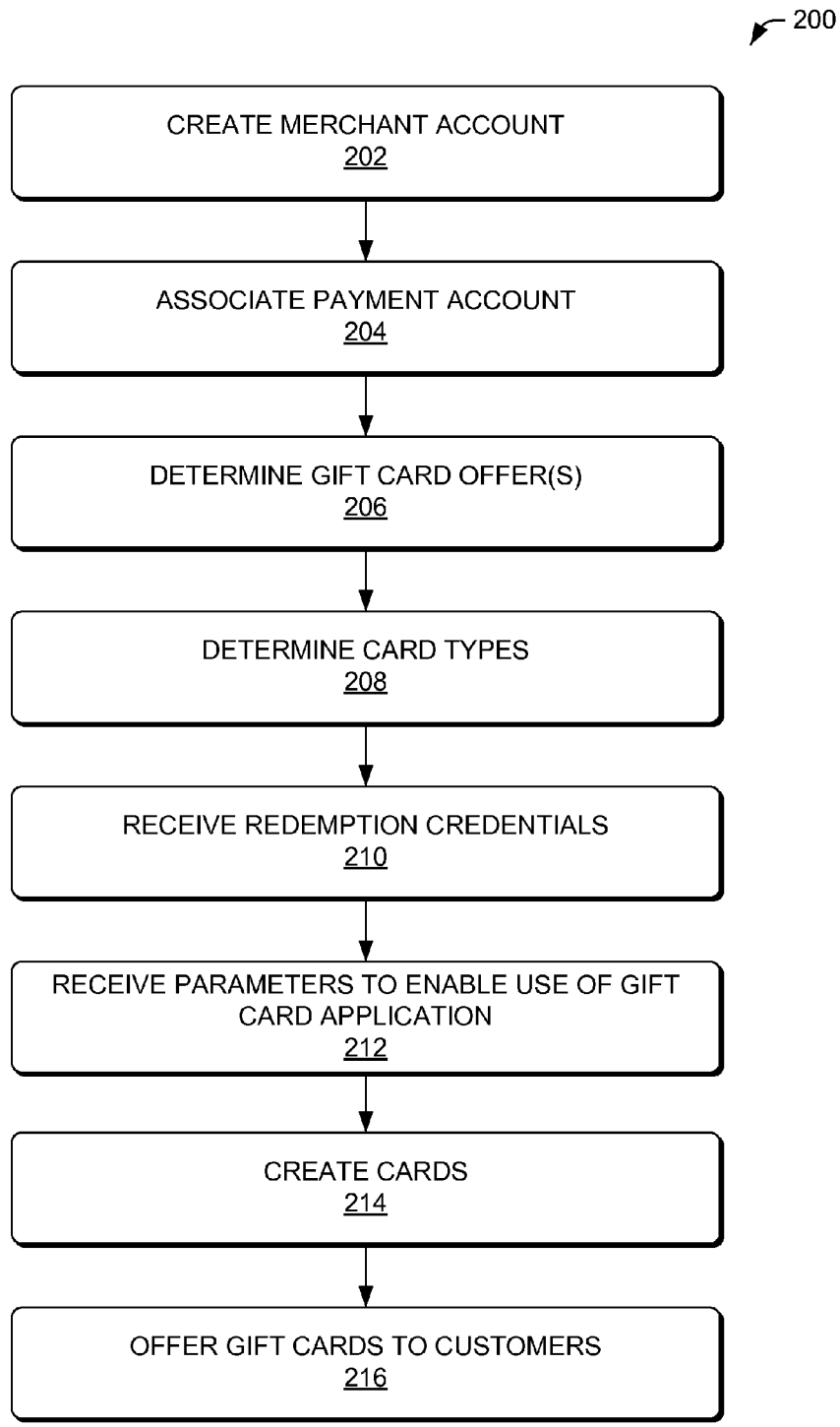
FIG. 2 is a flow diagram of an illustrative process to create a gift card program for a merchant.

FIG. 2 is a flow diagram of an illustrative process 200 to create a gift card program for the merchant. The process 200 is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 200, shall be interpreted accordingly.

The process 200 is described with reference to the environment 100 and includes operations that may be performed by the host 104 using the gift card manager 140 on the servers 116. However, in some instances, some of the operations may be performed at least in part by the merchant 102 using the gift card application 122 on the client 114. The process 200, and other processes described herein, may also be implemented using other systems or environments.

At 202, the account module 142 may create a merchant account that enables the merchant 102 to offer a gift card program. In some embodiments, the host 104 may enable the merchant 102 to create the account using a web interface that collects information from the merchant, images, and other types of data in a secure transaction.

At 204, the account module 142 may associate payment account information from the merchant 102 with the merchant account to enable the merchant and the host 104 to exchange money, payments, etc. For example, the payment accounts may enable payments for gift cards sold by the host 104 on behalf of the merchant, payment from the merchant for services performed by the host, and so forth.

At 206, the account manager 142 may determine the gift cards to be offered by the merchant 102. The merchant 102 may select various types of gift cards which may have various merchant-specified attributes. For example, in some instances, the merchant 102 may specify denominations for the gift cards and/or may allow customers (buyers) to specify the denominations. In various instances, the merchants may include expiration dates (if permissible), maintenance fees, restrictions on specific types of merchandise, or other attributes of the gift cards that may influence redemption of the gift card by the customers.

At 208, the account module 142 may determine card types, which may include physical cards (e.g., plastic gift cards, etc.) electronic gift cards, and/or other forms that include information necessary to process a gift card.

At 210, the account module 142 may add redemption credentials. The credentials may include login information to enable the merchant 102, via an employee, to access account information and to redeem gift cards using the gift card application 122.

At 212, the account module 142 may receive parameters to enable use of the gift card application 122. The parameters may include one or more conditions that, when satisfied allow use of the gift card application 122 by employees of the merchant 102. For example, the parameters may include the business hours of the merchant, the location of the merchant, or other types of conditions, that if not satisfied by the client 114, the employees, etc., prevent use of the gift card application 122 regardless of an authenticity of the credentials.

At 214, the account module 142 may create the gift cards for the merchant 102. In some instances, the creation of the gift cards may be performed electronically, which may allow a customer to purchase a gift card online and print a document that identifies the gift card. In other instances, physical gift cards may be sent to the merchant or the customer. The document may include a bar code or other machine-readable code.

At 216, the account module 142 may offer the gift cards to customers on behalf of the merchant 102 when the host 104 is authorized to sell the gift cards. For example, the host 104 may offer electronic gift cards for sale via a website while the merchant 102 may offer physical cards for sale at the merchant's store.

Figure 3:
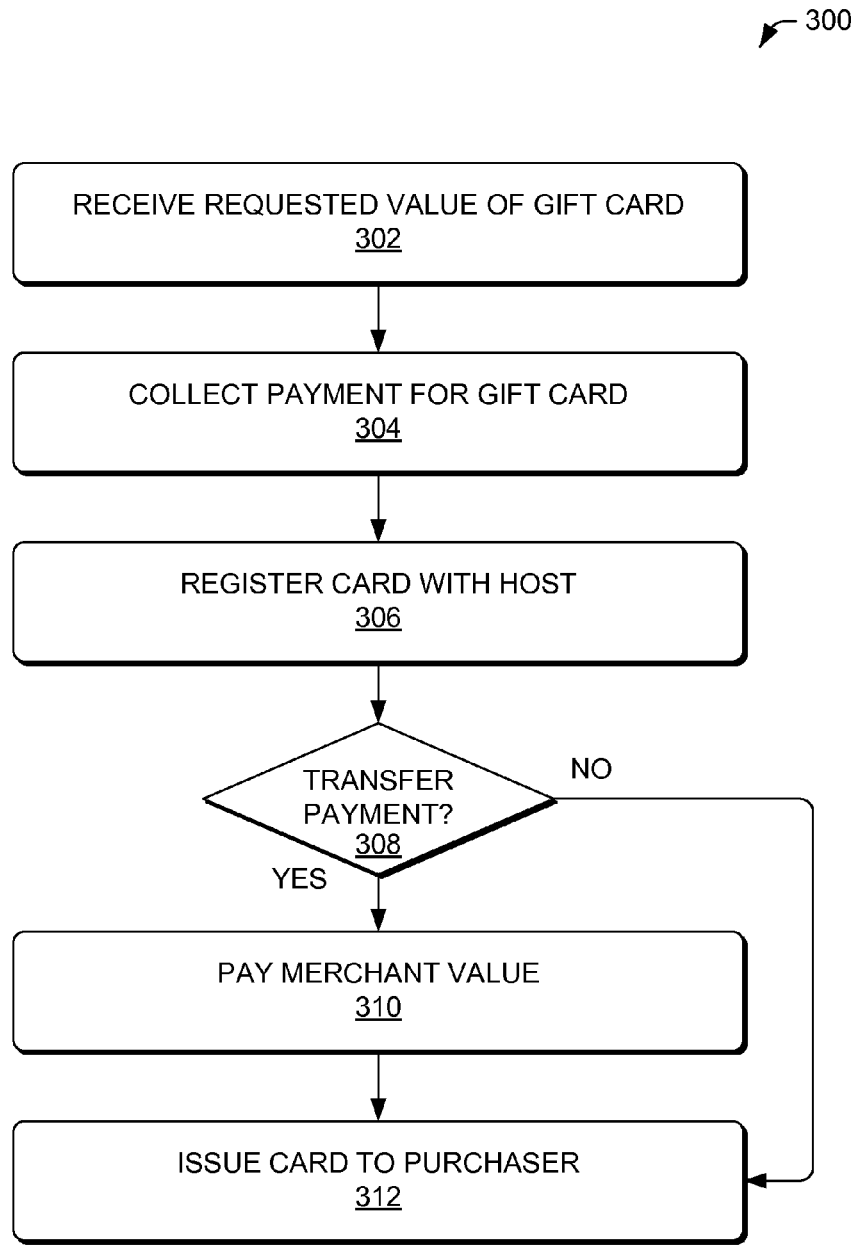
FIG. 3 is a flow diagram of an illustrative process to sell gift cards and register the sold gift cards with the host.

FIG. 3 is a flow diagram of an illustrative process 300 to sell gift cards and register the sold gift cards with the host. The process 300 is described with reference to the environment 100 and includes operations that may be performed in any order by the merchant 102 using the gift card application 122 and/or by the host 104 using the gift card manager 140. For illustrative purposes, the operations of the process are primarily described with reference to the gift card application 122.

At 302, the gift card application 122 may receive a value of a gift card to be purchased by one of the customers 108. For example, a customer may desire to purchase a gift card for $50, which may be a predetermined amount or an amount specified by the customer.

At 304, the merchant 102 may collect a payment for the gift card, such as a payment for $50 continuing with the above example.

At 306, the merchant may transmit a request using the gift card application 122 to the host 104 to register or activate the gift card for $50. The request may include a unique identifier of the gift card, which may be obtained by the client 114 from the gift card using a bar code reader, an RFID reader, a camera, or any other card reader device.

As discussed above, the operations 302-306 may also be performed by the host 104, such as in an online web-based environment. In some instances, the operations 302-306 may also be performed online by the merchant or at a physical location by the host 104.

At 308, the next operation may be contingent on whether the gift card is sold by the merchant 102 or the host 104, and thus whether a payment is to be transferred from the host to the merchant. Following the "yes route" from the decision operation 308, the payment module 146 may issue a payment to the merchant's account when the host sells the gift card on behalf of the merchant. In the example above, the host may transfer funds of $50 minus any transaction fees, etc. to the merchant's account.

At 312, the gift card may be issued to the customer, which may be performed by a physical exchange or an electronic exchange between the host and the customer (or the merchant and the customer). Returning to the decision operation 308, when no payment needs to be transferred to the merchant, such as when the merchant sells the gift card and receives the payment directly from the customer, the process 300 may continue at the operation 312 ("no" route). In some embodiments, the merchant 102 may ultimately pay a service fee to the host 104 for processing information for the gift cards when the merchant sells the cards because the host may otherwise have no access to the payment funds. Even when the merchant sells gift cards to the customers, the host 104 may track usage, balances, authenticity, and other attributes and information of the issued cards on behalf of the merchant.

Illustrative Redemption of Gift Cards

Figure 4:
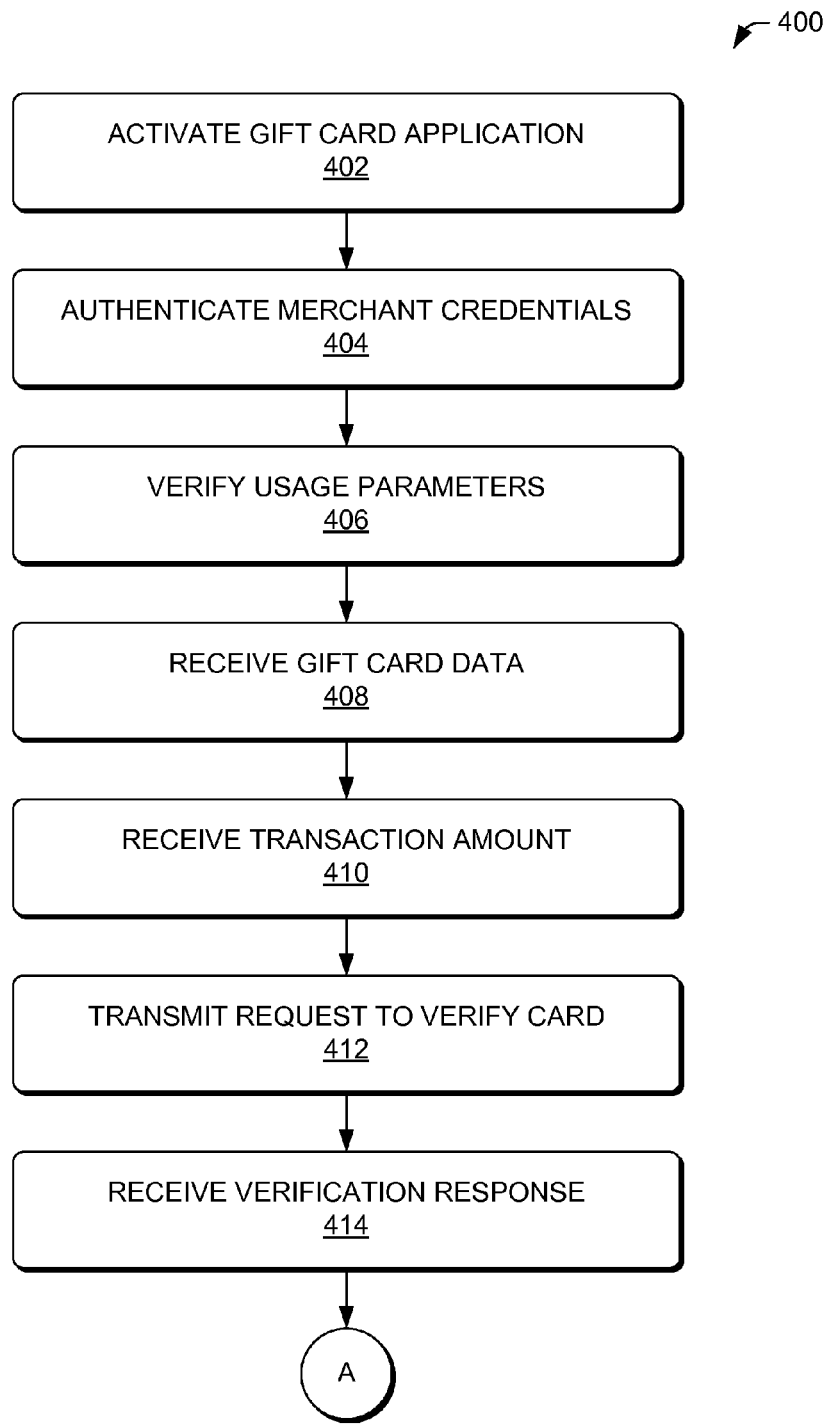
FIG. 4 is a flow diagram of an illustrative process to redeem a gift card at the merchant's location through the host.

FIG. 4 is a flow diagram of an illustrative process 400 to redeem a gift card at the merchant's location through the host 104. The process 400 is described with reference to the environment 100 and includes operations that may be performed in any order by the merchant 102 using the gift card application 122.

In accordance with various embodiments, the gift card application 122 may be accessed via the client 114, which may be a mobile telephone (e.g., smartphone), laptop computer, or other portable device. In some embodiments, the gift card application 122 may be implemented as stand-alone application for use on the client 114. However, the gift card application 122 may also be implemented as an application that is stored by the host 104 or in a cloud environment and may be accessed using a dedicated program or a generic browser application.

At 402, the merchant 102 may activate the gift card application 122, such as by directing the client 114 to open the application. The activation may also include establishing a connection with the host 104 via the network(s) 106.

At 404, the gift card application 122 may authenticate credentials of the merchant 102, such as credentials for an employee. In some instances, each employee of the merchant 102 may have unique credentials, which may have been registered at the operation 210 in the process 200.

At 406, the parameter module 124 may determine whether parameters associated with the gift card application and/or the client 114 are satisfied. For example, the parameters may determine whether the employee associated with the credentials received at the operation 404 is scheduled to work during the current time, whether the client 114 is located in the merchant's store (e.g., when the client is a mobile device such as a mobile phone with network access, etc.), and/or whether other conditions associated with use of the gift card application are satisfied.

At 408, the transaction module 128 may receive data associated with the gift card, such as a unique identifier. The transaction module 128 may receive the data by obtaining the data via an image or scan of a bar code, an RFID reader, a magnetic strip reader, or by other means to extract information from the card. In some instances, an employee may enter a number or other data into a field in the transaction module 128.

At 410, the transaction module 128 may receive a transaction amount associated with the redemption of the gift card. For example, the transaction amount may be inputted by an employee of the merchant 102, recorded by the client 114 using the code capture module 126 (e.g., OCR of an image of a sale total from the POS system 112, etc.), and/or by scanning items using the client.

At 412, the transaction module 128 may transmit a request to the host 104 to verify the authenticity of the gift card and a balance of the gift card. The request may include at least the data from the operation 408 and the transaction amount from the operation 410. In some instances, the request may also include a requested action (purchase, balance inquiry, etc.)

At 414, the transaction module 128 may receive a verification response from the host 104, such as from the gift card manager 140 which may have extracted information for the gift card from the gift card account data 148. Up to this point in the process 400, the merchant 102 has not redeemed the gift card and thus may still void a transaction or otherwise refrain from processing or redeeming value from the gift card.

Figure 5:
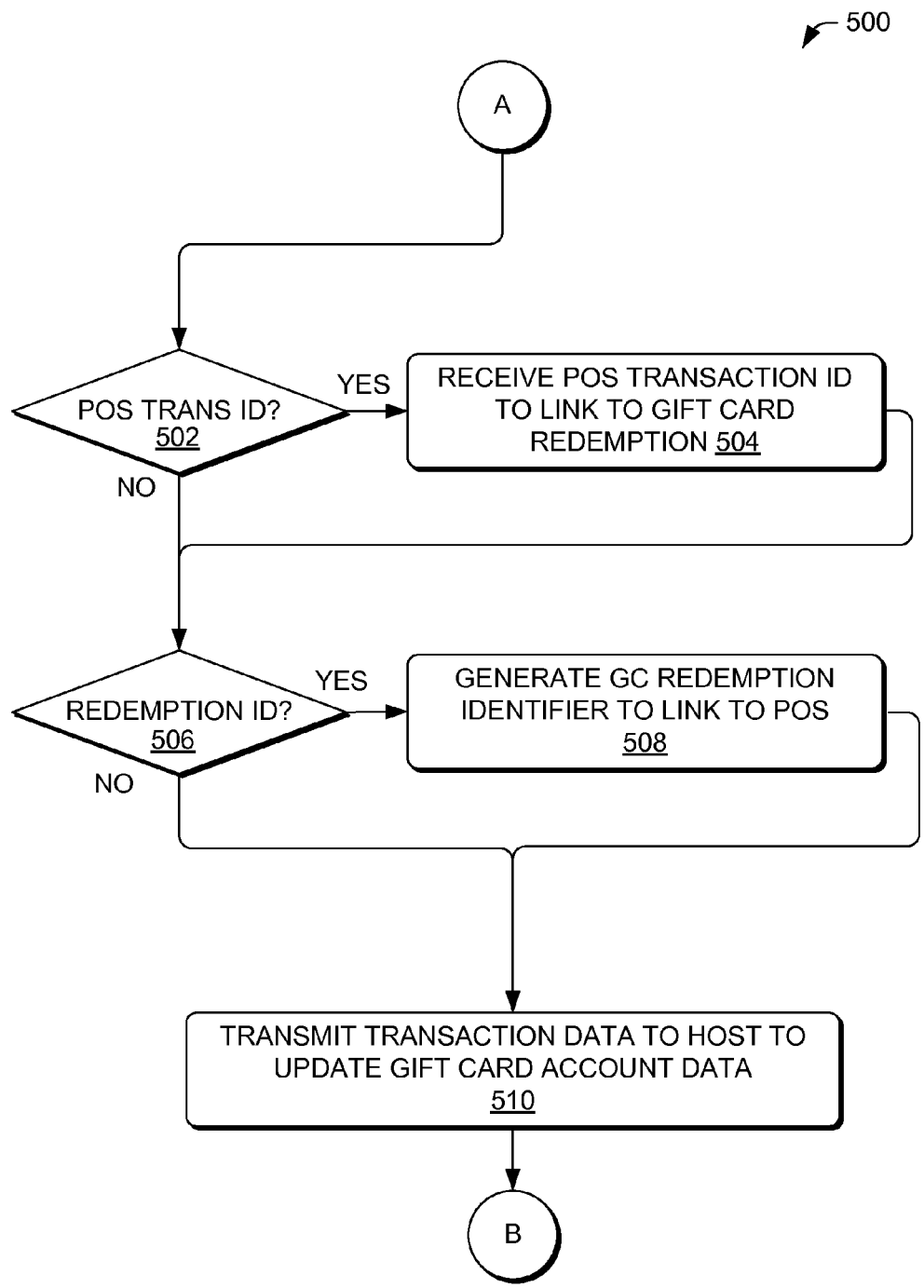
FIG. 5 is a flow diagram of an illustrative process to associate a transaction performed by a point of sale system with a transaction involving a gift card.
Figure 6:
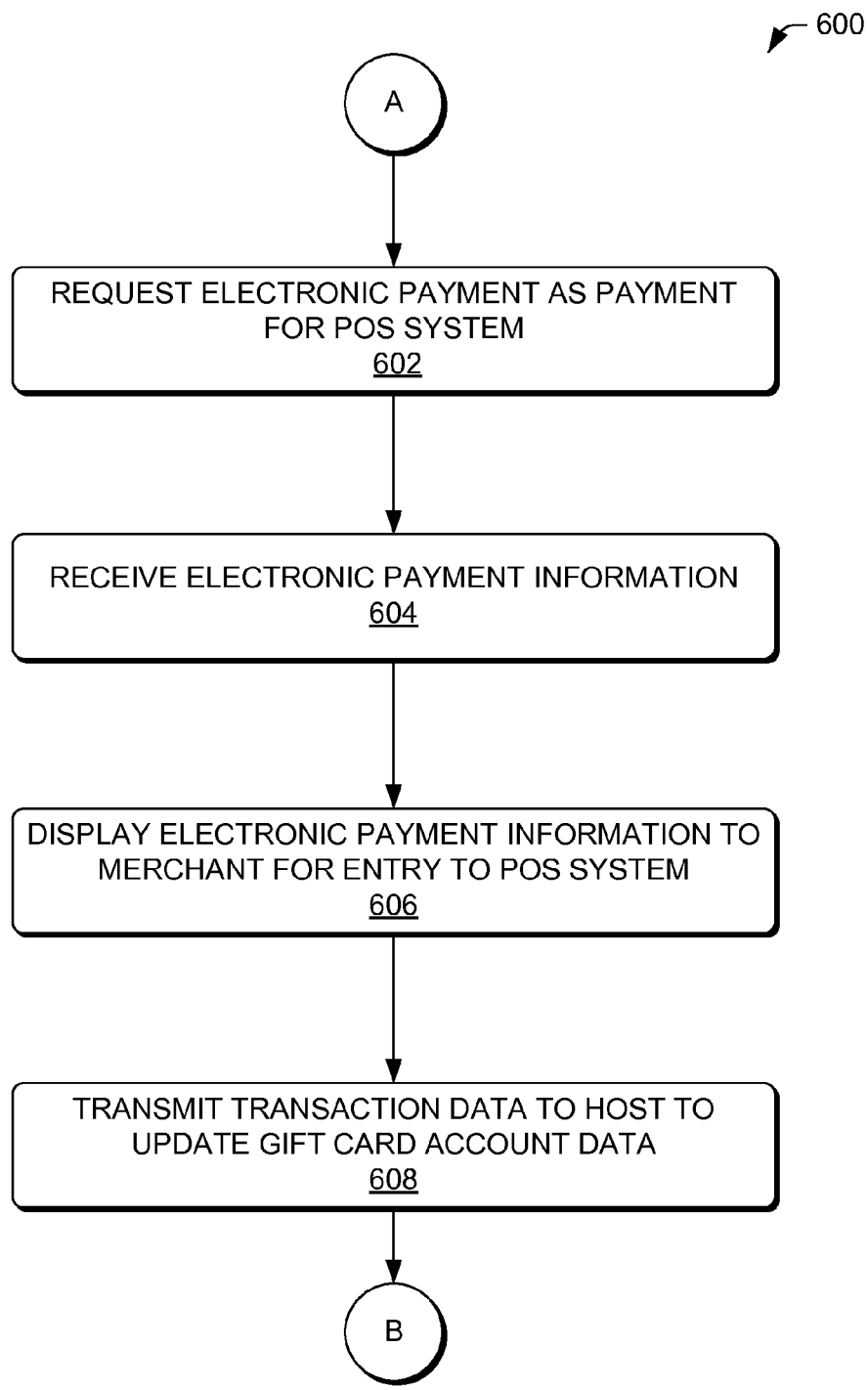
FIG. 6 is a flow diagram of an illustrative process to obtain a payment instrument to complete a point of sale transaction following redemption of the gift card.

FIGS. 5 and 6 show processes 500 and 600, respectively, which may continue from the process 400. The processes 500 and 600 may be implemented as alternatives and may be mutually exclusive. Thus, some embodiments may be implemented using the process 400 and the process 500 while other embodiments may be implemented using the processes 400 and the process 600. The processes 500 and 600 describe techniques to link data associated with redemption of a gift card using the gift card application 122 with data from the POS system 112. The processes 500 and 600 are described with reference to the environment 100 and include operations that may be performed in any order by the merchant 102 using the gift card application 122.

FIG. 5 is a flow diagram of an illustrative process 500 to associate a transaction performed by the POS system 112 with a transaction involving a gift card. At 502, the transaction module 128 may determine whether a POS transaction identifier (ID) is available for an associated sale conducted using the POS system 112. For example, a customer may desire to redeem the gift card for an item or service. The merchant 102 may process the item or service as a sale using the POS system 112, which may generate a POS transaction ID. The merchant 102 may use a default payment to complete the POS transaction or otherwise indicate that the transaction was paid for at least in part by redemption of the gift card. When POS transaction ID is available ("yes" route), at 504, the transaction module 128 may receive the POS transaction ID such as by entry of the POS transaction ID by an employee.

After receiving the POS transaction ID, or when the POS transaction ID is unavailable from the operation 502 ("no" route"), then the process 500 may proceed to another decision operation at 506. At 506, the transaction module 128 may generate a redemption ID, which may be associated with the sale using the POS system 112. For example, the transaction module 128 may generate a unique number as the redemption ID that may be entered into the existing POS system 112 to indicate that the sale was paid for at least in part by redemption of a gift card. When the redemption ID is available at 506 ("yes" route), then the redemption ID may be generated at 508 using the transaction module 128.

After generating the redemption ID at 508 or when the redemption ID is unavailable or not requested from 506 ("no" route), then the process 500 may proceed to 510 to transmit the transaction data to the host 104 to update the gift card account data 148.

FIG. 6 is a flow diagram of an illustrative process 600 to obtain a payment instrument to complete a point of sale transaction following redemption of the gift card. At 602, the transaction module 128 may transmit a request to the payment module 146 of the host 104 for an electronic payment based on the transaction amount from the operation 410, or alternatively, any remaining balance of a gift card to be redeemed. The transaction module 128 may receive information for the electronic payment at 604, which may include, for example, a one-time use payment account number for an amount specified by the payment module 146.

At 606, the transaction module 128 may display the information (e.g., account number, etc.) for the electronic payment to enable the merchant 102 to enter the electronic payment in the POS system 112 to pay for a pending sale.

At 608, the transaction module 128 may transmit transaction data, which may include additional details of the transaction such as a POS transaction ID, to the host 104 to update the gift card account data 148.

In some embodiments, when the process 600 is implemented, the payment module 146 may slowly disperse funds to the merchant that were collected from a sale of the gift cards by the host 104 rather than providing a lump sum payment to the merchant 102 after selling a gift card on behalf of the merchant. In various embodiments, the merchant may maintain a payment account with the host 104, which may receive lump sum payments from the host 104 after selling gift cards, but may maintain a balance and may be used to process gift card transactions through the POS system 112 in accordance with the process 600 (i.e., via the electronic payment). For example, during each cycle of the process 600, the merchant may transfer money from the payment account with the host 104 to another account maintained by the merchant 102 via a transaction (processing of a sale) involving the POS system 112. In these embodiments, the merchant 102 may still have access to the funds in the payment account stored by the host 104 should the merchant desire to use the funds for other purposes.

Illustrative Reporting of Gift Card Activity

Figure 7:
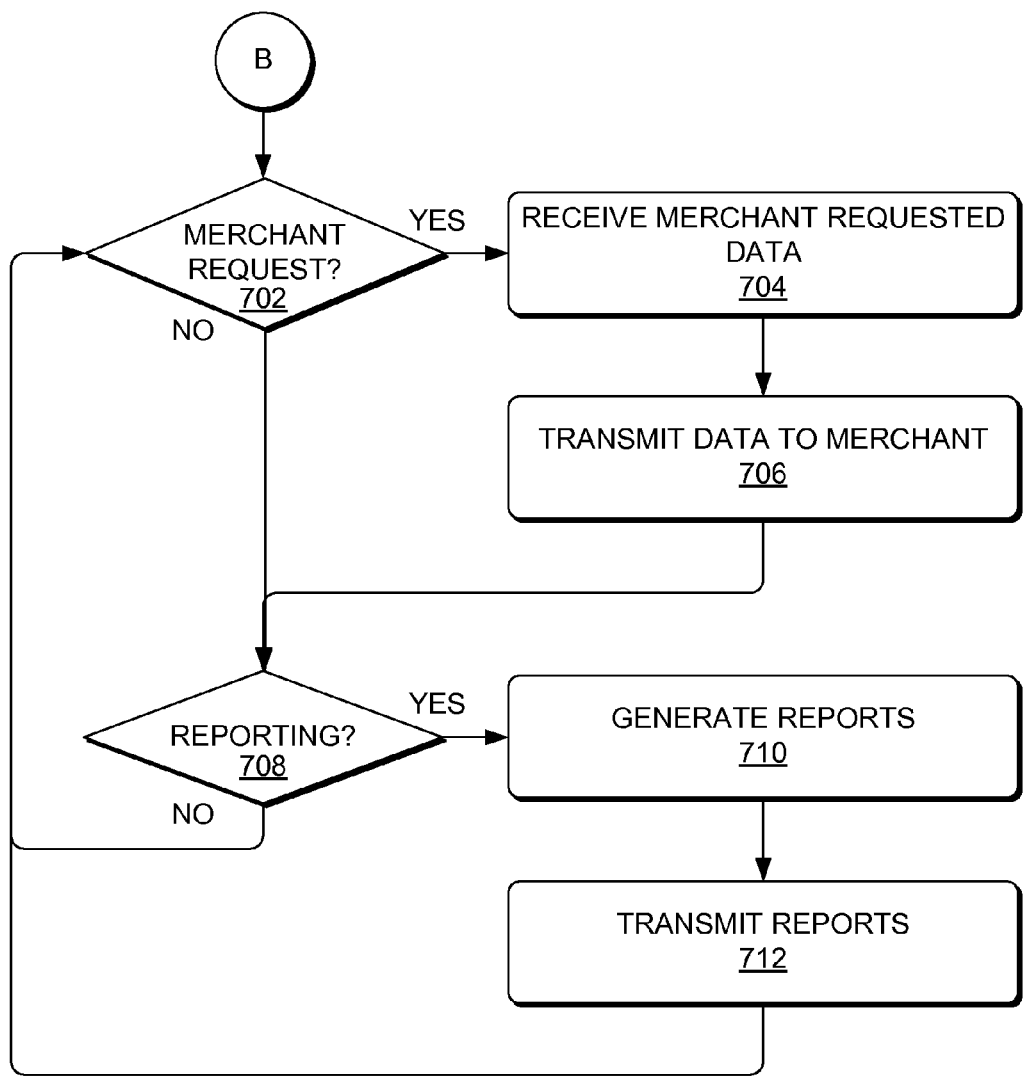
FIG. 7 is a flow diagram of an illustrative process to provide reporting for the host-managed gift card program.

FIG. 7 is a flow diagram of an illustrative process 700 to provide reporting for the host-managed gift card program. The process 700 is described with reference to the environment 100 and includes operations that may be performed in any order by the host 104 using the reporting module 144.

At 702, the reporting module 144 may receive a request from the merchant 102 for reporting information associated with the gift card account data 148. When the reporting module 144 receives a request at 702, then process 700 may continue to an operation 704 ("yes" route).

At 704, the reporting module 144 may receive a request for data from the merchant 102. The data may include a balance of a gift card, a balance for all outstanding gift cards, a request for a ledger of gift card activity, or other types of reports based on the information stored in gift card account data 148 and managed by the host 104 in response to interactions with the merchant 102 and the transaction module 128.

At 706, the reporting module 144 may transmit the data to the merchant 102, such as via the gift card application 122, by electronic mail, or by other means of transmitting reports.

At 708, the host 104 may determine whether to create reporting without a request from the merchant 102. For example, the reporting module 144 may generate periodic reports, such as reports that detail transaction during a specified time period. The report may include information provided to the host 104 from the transaction module 128, such as the POS transaction ID, which may enable the merchant 102 to reconcile transactions during an accounting process.

At 710, the reporting module 144 may generate one or more reports. At 712, the reporting module 144 may transmit the reports to the merchant 102, such as via the gift card application 122, by electronic mail, or by other means of transmitting reports.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more non-transitory computer-readable media storing computer-executable instructions that, when executed on one or more processors, perform acts comprising:
   determining one or more parameters used by an application to determine whether to redeem a gift card, the one or more parameters being based at least in part on a location of a computing device or a time of use of the computing device, the computing device being configured to facilitate redemption of the gift card through interaction with one or more servers of a host; and
   determining that the one or more parameters are satisfied by determining one of the time of use is within a predetermined time range or the location of the computing device is within a threshold distance of a predetermined location, and, in response to the determining that the one or more parameters are satisfied:
      causing a secure request to be transmitted to the host that includes an identifier of the gift card and a transaction amount to deduct from the gift card; and
      receiving from the host a response that includes at least one of an indication of an availability of the transaction amount or an indication of a balance of the gift card.

2. The one or more non-transitory computer-readable media as recited in claim 1, the acts further comprising causing a redemption request to be transmitted to the host to redeem the transaction amount or the balance of the gift card.

3. The one or more non-transitory computer-readable media as recited in claim 1, wherein the causing the secure request to be transmitted further includes transmitting to the host a point of sale transaction number of a transaction associated with use of the gift card.

4. The one or more non-transitory computer-readable media as recited in claim 3, the acts further comprising generating a ledger for the gift card that includes the identifier, an amount of a redemption request, and the point of sale transaction number.

5. The one or more non-transitory computer-readable media as recited in claim 2, the acts further comprising determining receipt of an electronic payment from the host to a payment account that is maintained with the host and is accessible by a merchant to pay an amount of the redemption request.

6. The one or more non-transitory computer-readable media as recited in claim 5, wherein the amount of the redemption request is redeemed with funds drawn from the payment account.

7. A computing system comprising:
   one or more hardware processors; and
   one or more memories storing computer-executable instructions that, when executed by the one or more hardware processors, cause the computing system to, at least:
      determine one or more parameters used by an application to determine whether to redeem a gift card, the one or more parameters being based at least in part on a location of a computing device or a time of use of the computing device, the computing device being configured to facilitate redemption of the gift card through interaction with one or more servers of a host; and
      determine that the one or more parameters are satisfied by determining one of the time of use is within a predetermined time range or the location of the computing device is within a threshold distance of a predetermined location, and, in response to the determining that the one or more parameters are satisfied:
         cause a secure request to be transmitted to the host that includes a transaction amount to deduct from the gift card and one or more of a machine-readable code associated with the gift card, an image of at least a portion of the gift card, or an identifier associated with the gift card; and
         receive from the host a response that includes at least one of an indication of an availability of the transaction amount or an indication of a balance of the gift card.

8. The computing system as recited in claim 7, wherein the secure request further includes a point of sale transaction number of a transaction associated with use of the gift card.

9. The computing system as recited in claim 7, wherein the instructions further cause the computing system to receive information for an electronic payment from the host to pay an amount of a redemption request, the amount of the redemption request being the transaction amount or the balance of the gift card.

10. The computing system as recited in claim 7, wherein the instructions further cause the computing system to determine that credentials of the merchant are satisfied.

11. The computing system as recited in claim 10, wherein the predetermined location is associated with the merchant.

12. The computing system as recited in claim 10, wherein the predetermined time range coincides with operating hours of a store.

13. A method comprising:
  determining, by at least one or more computing devices, one or more parameters used by an application to determine whether to redeem a gift card, the one or more parameters being based at least in part on a location of a computing device or a time of use of the computing device, the computing device being configured to facilitate redemption of the gift card through interaction with one or more servers of a host; and
  determining, by at least one of the one or more computing devices, that the one or more parameters are satisfied by determining one of the time of use is within a predetermined time range or the location of the computing device is within a threshold distance of a predetermined location, and, in response to the determining that the one or more parameters are satisfied:
    causing, by at least one of the one or more computing devices, a secure request to be transmitted to the host that includes a transaction amount to deduct from the gift card and one or more of a machine-readable code associated with the gift card, an image of at least a portion of the gift card, or an identifier associated with the gift card; and
    receiving, by at least one of the one or more computing devices, from the host a response that includes at least one of an indication of an availability of the transaction amount or an indication of a balance of the gift card.

14. The method as recited in claim 13, further comprising receiving the application from the host on a mobile telephone.

15. The method as recited in claim 13, further comprising receiving a report from the host that includes an updated balance of the gift card.

16. The method as recited in claim 13, further comprising causing transaction data to be transmitted to the host, the transaction data including a point of sale transaction identifier.

17. The method as recited in claim 13, wherein the predetermined location is associated with the merchant.

18. The method as recited in claim 13, wherein the predetermined time range coincides with operating hours of a store.

19. The method as recited in claim 13, further comprising receiving information for an electronic payment from the host to pay an amount of a redemption request, the amount of the redemption request being the transaction amount or the balance of the gift card.

20. The method as recited in claim 19, further comprising causing the redemption request to be transmitted, either as part of the secure request or as a separate request from the secure request, to the host to redeem the transaction amount or the balance of the gift card with funds drawn from a payment account that is maintained with the host and is accessible by a merchant.

* * * * *